Dec. 14, 1965 B. BERNSTEIN 3,223,895

SOLDERING OF DIODE STRING

Filed June 18, 1962

INVENTOR.
BERNARD BERNSTEIN

BY James and Franklin

ATTORNEYS

United States Patent Office 3,223,895

Patented Dec. 14, 1965

3,223,895

SOLDERING OF DIODE STRING

Bernard Bernstein, Brooklyn, N.Y., assignor to General Instrument Corporation, Newark, N.J., a corporation of New Jersey Filed June 18, 1962, Ser. No. 203,368
2 Claims. (Cl. 317—101)

This invention relates to diode strings, and more particularly to the soldering together of components to form such a string.

A string of silicon diodes may be used in series for high voltage work. To help assure uniform voltage distribution, it is already known to employ shunt resistors of high value, and to help take care of transient voltages it is known to employ shunt capacitors.

Such strings have been made with diodes, resistors and capacitors of relatively large size. A co-pending application of Chester L. Schuler, Serial No. 204,003, filed June 20, 1962, now Patent No. 3,188,549, and entitled, "High Voltage Silicon Rectifier," discloses a silicon rectifier string using a considerable number of tiny components, the string being coiled into a helix which is potted in a puck-shaped casing.

The object of the present invention is to provide an improved method and apparatus for facilitating the soldering of the components in such a string. A further object is to strengthen the soldered connections. Still another object is to reduce the likelihood of corona discharge.

To accomplish the foregoing general objects, and other more specific objects which will hereinafter appear, my invention resides in the method steps and apparatus elements and their relation one to another, as are hereinafter described in the following specification. The specification is accompanied by a drawing in which.

Figures 1, 2, 3, 4, 5, 6, 7, 8, 9:
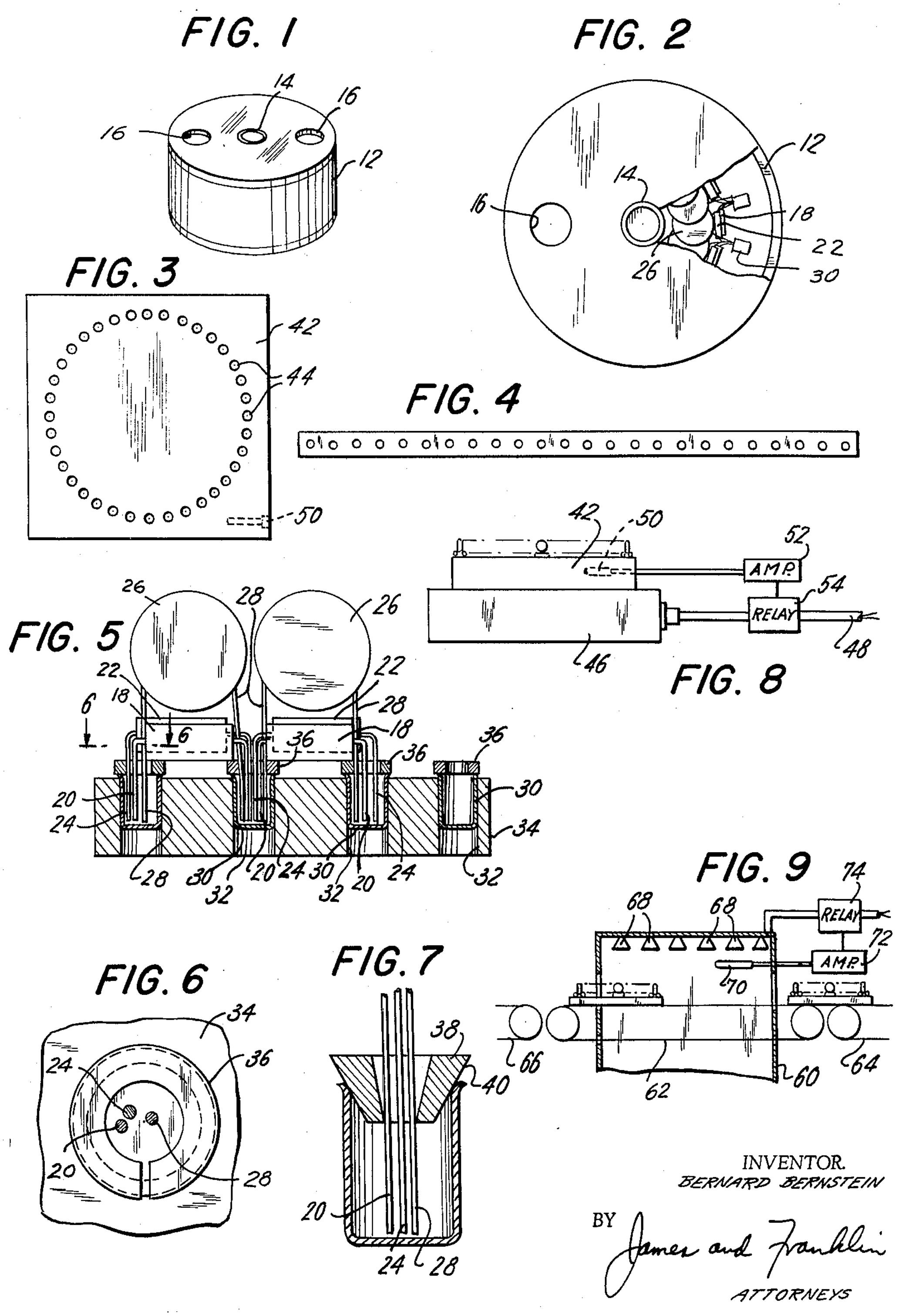
FIG. 1 is a perspective view showing a puck-shaped module containing a silicon diode string.
FIG. 2 is a plan view, drawn to larger scale, with the cover partly broken away to expose a part of the string.
FIG. 3 is a plan view, drawn to smaller scale, showing a metal block for helping assemble and solder the diode string.
FIG. 4 shows another block in elongated or bar form.
FIG. 5 is a fragmentary section, drawn to enlarged scale, to help explain the soldering method.
FIG. 6 is a fragmentary plan view, drawn to enlarged scale, taken at the line 6—6 of FIG. 5.
FIG. 7 is a vertical section taken through a cup with a different form of solder ring.
FIG. 8 is a schematic view showing how the block of FIG. 3 may be used with a hot plate having automatic temperature control.
FIG. 9 is a schematic view showing how the block of FIG. 3 or FIG. 4 may be used in a temperature controlled furnace having a conveyor belt.

Referring to the drawing, and more particularly to FIGS. 1 and 2, the module there shown comprises a relatively flat cylindrical or puck-shaped casing 12 with a recessed internally threaded metal terminal 14 at each end. Holes 16 serve for filling the casing with potting material after it has received its diode string.

The diode string comprises silicon diodes with shunt resistors and capacitors. The diodes are of the small glass sealed type, the diode then being a tiny cylinder 18 (FIG. 5) with short leads 20 extending generally perpendicular to the cylinder. The resistor is a tiny cylinder 22 with short leads 24 extending generally perpendicular to the cylinder. The capacitor 26 is of the flat disc type. Uusually a silver coating is applied on each side of a thin ceramic disc, to act as the capacitor plates, and after the leads 28 have been attached, the capacitor is dipped or otherwise coated with outside insulation The spacing of the leads 20, 24 and 28 is approximately the same. Moreover, the leads are pliable and are readily spread or moved together as may be necessary.

Referring to FIG. 2, a long string of components like those shown in FIG. 5 is bent, with the capacitors 26 at the inside in partially overlapping relation, and with the soldered leads at the outside. The diodes 18 and resistors 22 assume a tangential position at an intermediate radius. The string is thus bent to form a helix. One end of the string is soldered to a terminal like that shown at 14 at one end of the module, and the other end is similarly soldered to a terminal at the other end of the module. A helix of insulating material, preferably "Mylar," may be disposed with its turns between the turns of the string, and an epoxy potting material may be used to then fill the module.

Referring now to FIG. 5, my method includes inserting small metal cups 30 in a series of holes 32 in a metal block 34. The three leads at each end of the three shunt components 18, 22 and 26 are inserted into spaced cups, and this is repeated for adjacent shunt components, so that in all there are six leads in each cup. The leads are then soldered in the cup, so that they are soldered to one another and to the cup.

To facilitate the soldering operation, a small solder ring 36 may be placed at each cup, and the leads may be inserted through the hole in the ring (FIGS. 5 and 6). After assembly of all of the components and cups for the desired diode length, the assembly may be heated to melt the solder, which then runs into the cups and tends to fill the cups as well as to solder the leads together and to the cups.

From inspection of FIG. 2 it will be seen that the use of the metal cups not only facilitates the soldering operation and strengthens the resulting soldered connection, but also minimizes the likelihood of corona discharge. This is so because the rounded surface of the cup replaces the ends of the leads, which might otherwise be jagged and irregular.

Instead of a flat solder ring like that shown in FIG. 5, the ring may be given a frusto-conical configuration, thereby anchoring it more securely in the cup during the insertion of the leads of the components. Such a soldering ring is shown in FIG. 7, the ring 38 having a frusto-conical side wall 40, the small end of which readily enters the cup, and the large end of which prevents it from falling to the bottom of the cup. This configuration also helps insure flow of the solder into the cup.

In preferred form the small metal cups 30 are standard closed-end eyelet blanks. These are readily and inexpensively available, because they are used widely in eyeletting machines. They are preferably made of brass, and for the present purpose they are preferably cadmium plated to aid the soldering operation.

The block 34 may be given any of a number of configurations. In FIG. 3 the block is square, as shown at 42, and the holes 44 are formed in a circle. In a typical case the diode string may require thirty-four diodes in series for operation at say 20,000 volts, and in such case the block 42 is provided with a corresponding number of holes. In practice it may have, say thirty-six holes, with one left without a cup and solder ring. Thirty-five of the holes receive thirty-five cups for the thirty-four diodes. The cups at the ends of the string each receive three short leads and a longer terminal wire for connecting the string into apparatus, or in the case of FIGS. 1 and 2, to the terminals 14 of the puck 12.

With a block having a ring of holes as shown in FIG. 3, the block may be heated on an ordinary electrically heated hot plate. This is shown in FIG. 8, in which the block 42 rests on a hot plate 46 which is heated from an electrical supply source connected at 48. The block is preferably made of a good heat conductive metal such as aluminum, so that it quickly assumes a uniform temperature.

The silicon diode may be injured if heated to a temperature exceeding say 200° C. I therefore recommend that the temperature of the block be limited to a somewhat lower value, say 175° C. This may be automatically controlled, as by the provision of a thermocouple or other temperature-sensitive device 50, which may be embedded in block 42. The response of this thermocouple may be amplified in a suitable amplifier 52, and the output of the amplifier is used to control a relay 54 in the heater supply circuit 48. The relay is opened and closed at intervals such as to maintain an average temperature of 175 degrees, the range depending on the refinement of the circuitry. It may be from 170 to 180 degrees, or 165 to 185 degrees, there being considerable tolerance in this respect.

It will be understood that when the solder rings have melted, the block 42 may be removed for cooling, it being replaced by another such block loaded with the components for another string, and so on. When the solder has cooled, the string is readily lifted out of the block, and it then may be unrolled or flattened out, the leads being pliable. The straight string then may again be coiled, but this time in flat relation, with the capacitors overlapping at the inside, and with the metal cups outermost and in radial position, as shown in FIG. 2. This assumes use of the string in a puck-shaped module, but the string could be used in a circle as in FIG. 3, or straight, or in other ways and shapes.

The metal block may be elongated or bar-shaped as shown in FIG. 4. The process followed is the same as before, that is, the block is loaded with metal cups which are loaded with solder rings. The groups of components are then applied until there are six leads passing into each cup.

Instead of heating the block with a hot plate, the block may be moved slowly through a heated chamber or oven. Such an arrangement is shown in FIG. 9, in which an oven 60 is traversed by an endless conveyor 62. This may be much longer than the oven, or it may be preceded and followed by additional conveyors 64 and 66. Resistance elements may be used in the oven, or, as here shown, a bank of infra-red lamps 68 may be used for radiant heating, the heat being directed toward the solder rings at the top of the cups.

Here again the apparatus is preferably provided with means for automatic temperature control, here shown schematically. A suitable temperature-responsive device 70 is connected to an amplifier 72, which in turn operates a relay 74 in the current supply line leading to the lamps 68. It will be understood that some lamps may be left on continuously, and others turned on and off by the relay, in order to regulate the temperature with less hunting. When using bar shaped blocks, as in FIG. 4 the lamps may be located at the sides of the conveyor, instead of above the conveyor. Similar control circuitry with only part of the resistors turned on and off may be employed when using resistance heating elements instead of lamps.

It will be understood that either the square blocks shown in FIG. 3 or the bars shown in FIG. 4 may be heated by placing them on a conveyor belt passing through an oven, instead of using a hot plate as shown in FIG. 8.

The solder used for the solder ring is preferably a 50/50 soft solder, which will readily melt at a temperature well below that which might injure a silicon diode.

It is believed that the method and apparatus for soldering diode strings, as well as the advantages thereof, will be apparent from the foregoing detailed description. It will also be apparent that while I have shown and described the invention in several preferred forms, changes may be made without departing from the scope of the invention as sought to be defined in the following claims.

I claim:

1. In the manufacture of a string of silicon diodes with shunt resistors and capacitors, the diodes and resistors being collateral and being tiny cylinders with short leads extending generally perpendicular to the cylinders, the capacitors being of the flat ceramic disc type, the method which includes temporarily inserting small loose cups in a series of uniformly spaced holes in a metal block, said cups being standard closed-end eyelet blanks, placing a ring-shaped solder preform at the top of each eyelet blank, inserting the three leads at each end of the three shunt components through a solder ring and into a cup, repeating this for adjacent shunt components so that there are six leads in each cup, heating the assembly to melt the solder to run into the cups, controlling the heating temperature not to exceed a predetermined temperature which might prove injurious to the silicon diodes, cooling the solder, and removing the resulting string from the block, with said cups being unsupported except by said string.

2. A silicon diode rectifier string comprising a relatively long string of tiny glass enclosed silicon diodes, a resistor and a capacitor in shunt with each diode, said capacitors being of the flat ceramic disc type, said diodes and resistors being collateral and being tiny cylinders with leads at the ends, said leads being short and bent generally perpendicular to the axis of the cylinder, said cylinders being disposed end-to-end in the string, each of said diodes, resistors, and capacitors having two leads, and tiny metal cups, said cups being standard closed-end eyelet blanks, one of said cups receiving the six leads at the adjacent ends of successive units of the string, said six leads being soldered in said cup, the leads of said diodes, resistors, and capacitors being flexible, and said string therefore being bendable, but because of its multiple soldered leads said string being stiff enough to be self-supporting in configuration, and said cups being supported solely by said string.

References Cited by the Examiner

UNITED STATES PATENTS

| | | | |
|---|---|---|---|
| 2,502,291 | 3/1950 | Taylor | 174—68.5 |
| 2,728,977 | 1/1956 | Beezley | 29—283 |
| 2,871,547 | 2/1959 | Huggins | 29—155.5 |
| 2,871,549 | 2/1959 | Arnold | 29—155.5 |
| 2,889,532 | 6/1959 | Slack | 174—68.5 |
| 3,001,104 | 9/1961 | Brown | 317—101 |
| 3,031,744 | 5/1962 | Stein | 29—283 |
| 3,046,452 | 7/1962 | Gellert | 317—101 |
| 3,054,024 | 9/1962 | Von Dillen et al. | 317—101 |
| 3,065,524 | 11/1962 | Donnell | 339—17 |
| 3,088,181 | 5/1963 | Breiling | 29—155.5 |
| 3,123,664 | 3/1964 | Logan | 174—68.5 |

FOREIGN PATENTS

| | | |
|---|---|---|
| 1,107,758 | 5/1961 | Germany. |

KATHLEEN H. CLAFFY, *Primary Examiner.*

JOHN F. BURNS, LARAMIE E. ASKIN, R. L. GABLE, J. G. COBB, H. RICHMAN, *Assistant Examiners.*